(12) United States Patent
A et al.

(10) Patent No.: US 11,640,291 B2
(45) Date of Patent: *May 2, 2023

(54) INTENT-BASED, NETWORK-AWARE NETWORK DEVICE SOFTWARE-UPGRADE SCHEDULING

(71) Applicant: Juniper Networks, Inc., Sunnyvale, CA (US)

(72) Inventors: Chandrasekhar A, Bangalore (IN); Jayanthi R, Coimbatore (IN); Javier Antich, Valencia (ES)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,773

(22) Filed: Dec. 31, 2020

(65) Prior Publication Data

US 2021/0124570 A1    Apr. 29, 2021

Related U.S. Application Data

(63) Continuation of application No. 16/414,447, filed on May 16, 2019, now Pat. No. 10,884,728.

(30) Foreign Application Priority Data

Apr. 10, 2019  (EP) .................................. 19382267

(51) Int. Cl.
*G06F 8/65* (2018.01)
*G06F 16/901* (2019.01)
(Continued)

(52) U.S. Cl.
CPC ............ *G06F 8/65* (2013.01); *G06F 16/9024* (2019.01); *H04L 41/12* (2013.01); *H04L 41/20* (2013.01); *H04L 67/34* (2013.01)

(58) Field of Classification Search
CPC ..... G06F 16/9024; G06F 8/65; H04L 41/082; H04L 41/0893; H04L 41/12; H04L 41/20;
(Continued)

(56) References Cited

U.S. PATENT DOCUMENTS

| 5,870,559 A | 2/1999 | Leshem et al. |
| 5,933,642 A | 8/1999 | Greenbaum et al. |

(Continued)

FOREIGN PATENT DOCUMENTS

| CN | 105227342 A | 1/2016 |
| CN | 108234356 A | 6/2018 |

(Continued)

OTHER PUBLICATIONS

First Office Action and Search Report, and translation thereof, from counterpart Chinese Application No. 201910909817.3, dated Mar. 4, 2021, 13 pp.

(Continued)

*Primary Examiner* — Hanh Thi-Minh Bui
(74) *Attorney, Agent, or Firm* — Shumaker & Sieffert, P.A.

(57) ABSTRACT

A controller device manages a plurality of network devices. The controller device includes one or more processing units configured to receive an upgrade request; obtain a redundancy model indicating network device redundancies or service redundancies; determine, based on the upgrade request and the redundancy model, an update graph having nodes each representing one of the network devices or one of the services, the update graph also having at least one edge that connects two of the nodes and that indicates the network redundancy or the service redundancy; determine, based on the update graph including the at least one edge, an update schedule for performing an update of software for the network devices that ensures availability for the first net- (Continued)

work device or second network device or availability for the service; and update the software of each of the network devices according to the update schedule.

20 Claims, 6 Drawing Sheets

(51) Int. Cl.
   *H04L 41/12* (2022.01)
   *H04L 41/00* (2022.01)
   *H04L 67/00* (2022.01)
(58) Field of Classification Search
   CPC ..... H04L 67/325; H04L 67/32; H04L 67/327; H04L 67/34
   See application file for complete search history.

(56) References Cited

U.S. PATENT DOCUMENTS

| | | | |
|---|---|---|---|
| 6,078,744 A | 6/2000 | Wolczko et al. | |
| 6,678,646 B1 | 1/2004 | McConnell et al. | |
| 6,973,488 B1 | 12/2005 | Yavatkar et al. | |
| 7,209,473 B1 | 4/2007 | Mohaban et al. | |
| 8,266,416 B2 | 9/2012 | Ishihara et al. | |
| 8,571,882 B1 | 10/2013 | Teitelbaum | |
| 9,117,071 B2 | 8/2015 | Beretta et al. | |
| 9,727,339 B2 | 8/2017 | Zelsnack | |
| 9,734,056 B2 | 8/2017 | Shi et al. | |
| 10,102,172 B1 | 10/2018 | Mai et al. | |
| 10,200,248 B1 | 2/2019 | Jiang et al. | |
| 10,278,112 B1 | 4/2019 | A et al. | |
| 10,374,886 B1 | 8/2019 | A et al. | |
| 10,567,223 B1 | 2/2020 | Sidaraddi et al. | |
| 10,884,728 B2 | 1/2021 | A et al. | |
| 10,892,952 B2 | 1/2021 | A et al. | |
| 2004/0064538 A1 | 4/2004 | Wong | |
| 2009/0164773 A1 | 6/2009 | Ishihara et al. | |
| 2013/0191766 A1 | 7/2013 | Ragusa et al. | |
| 2014/0181797 A1 | 6/2014 | Beretta et al. | |
| 2015/0381515 A1 | 12/2015 | Mattson et al. | |
| 2016/0062746 A1 | 3/2016 | Chiosi et al. | |
| 2016/0211988 A1 | 7/2016 | Lucas et al. | |
| 2016/0269250 A1 | 9/2016 | Astigarraga et al. | |
| 2016/0342397 A1 | 11/2016 | Goetz et al. | |
| 2016/0350095 A1 | 12/2016 | Ramachandran et al. | |
| 2017/0054758 A1 | 2/2017 | Maino et al. | |
| 2017/0187577 A1 | 6/2017 | Nevrekar et al. | |
| 2018/0167277 A1 | 6/2018 | Mahimkar et al. | |
| 2018/0210927 A1 | 7/2018 | Karam et al. | |
| 2018/0276863 A1 | 9/2018 | Nerurkar et al. | |
| 2018/0329958 A1* | 11/2018 | Choudhury | G06F 16/2456 |
| 2018/0375715 A1* | 12/2018 | Kaliski, Jr | H04L 61/5076 |
| 2019/0182119 A1* | 6/2019 | Ratkovic | H04L 41/145 |
| 2019/0266619 A1 | 8/2019 | Namba et al. | |
| 2019/0317749 A1 | 10/2019 | Hu et al. | |
| 2020/0084120 A1 | 3/2020 | A et al. | |

FOREIGN PATENT DOCUMENTS

| | | |
|---|---|---|
| CN | 109155741 A | 1/2019 |
| CN | 109271621 A | 1/2019 |
| EP | 2961100 A1 | 12/2015 |
| FR | 2902954 A1 | 12/2007 |
| WO | 2016048326 A1 | 3/2016 |
| WO | 2017204872 A1 | 11/2017 |

OTHER PUBLICATIONS

Response to Extended Search Report dated Oct. 15, 2019 from counterpart European Application No. 19382267.3, filed Apr. 13, 2021, 14 pp.
Prosecution History from U.S. Appl. No. 16/414,447, dated Apr. 2, 2020 through Sep. 9, 2020, 14 pp.
"Gremlin Docs," gremlindocs.spmallette.documentup.com, retrieved on Mar. 29, 2019, 34 pp.
"Gremlin," Github, github.com/tinkerpop/gremlin/wiki, Jul. 11, 2016, 4 pp.
"Openconfig," openconfig.net, 2016, 1 pp. (Applicant points out, in accordance with MPEP 609.04(a), that the year of publication, 2016, is sufficiently earlier than the effective U.S. filing date, so that the particular month of publication is not in issue.).
"OpenConfig," Github, github.com/openconfig, retrieved on Mar. 29, 2019, 3 pp.
Athanas et al., "An Adaptive Hardware Machine Architecture and Compiler for Dynamic Processor Reconfiguration," Laboratory for Engineering Man/Machine Systems, Division of Engineering, Brown University, 1991, 4 pp.
Bierman et al., "RESTCONF Protocol," IETF, RFC 8040, Jan. 2017, 137 pp.
Bjorklund, "YANG—A Data Modeling Language for the Network Configuration Protocol (NETCONF)," Internet Engineering Task Force, RFC 6020, Oct. 2010, 174 pp.
Extended Search Report from counterpart European Application No. 19382267.3, dated Oct. 15, 2019, 8 pp.
Harrington et al., "An Architecture for Describing Simple Network Management Protocol (SNMP) Management Frameworks," Network Working Group, Request for Comments: 3411, Dec. 2002, 65 pp.
Mohammed Bensaleh et al., Optimal Task Scheduling for Distributed Cluster With Active Storage Devices and Accelerated Nodes, IEEE, Aug. 29, 2018, retrieved online Sep. 3, 2020, pp. 48195-48209. Retrieved from the Internet:URL: https://ieeexplore.ieee.org/stamp/stamp.jsp?tp=&arnumber=8449921.
Nguyen, "Model-based Version and Configuration Management for a Web Engineering Lifecycle," Proceedings of the 15th International Conference on World Wide Web, ACM, New York, NY, May 23, 2006, 10 pp.
Ribeiro et al., "G-Tries: an efficient data structure for discovering network motifs," Proceedings of the 2010 ACM Symposium on Applied Computing, New York, NY, Mar. 22, 2010, 8 pp.
Sadasivarao et al., "Demonstration of Advanced Open WDM Operations and Analytics, based on an Application-Extensible, Declarative, Data Model Abstracted Instrumentation Platform," 2019 Optical Fiber Communications Conference and Exhibition, OSA, Mar. 3, 2019, 3 pp.
Sivakumar et al., "Concepts of Network Intent," draft-moulchan-nmrg-network-intent-concepts-00, Internet Research Task Force, Oct. 28, 2017, 10pp.
U.S. Appl. No. 16/370,189, Juniper Networks, Inc. (Inventor: Chandrasekhar A), filed Mar. 29, 2019.
U.S. Appl. No. 16/370,243, Juniper Networks, Inc. (Inventor: Chandrasekhar A), filed Mar. 29, 2019.
U.S. Appl. No. 16/456,976, Juniper Networks, Inc. (Inventor: Chandrasekhar A), filed Jun. 28, 2019.
U.S. Appl. No. 15/462,465, filed Mar. 17, 2017, entitled "Configuring and Managing Network Devices Using Program Overlay on Yang-Based Graph Database".
U.S. Appl. No. 16/125,245, filed Sep. 7, 2018, entitled "Dynamic Intent Assurance and Programmability in Computer Networks".
U.S. Appl. No. 16/144,313, filed Sep. 27, 2018, entitled: "Supporting GRAPHQL Based Queries on Yang Based Configuration Data Models".
U.S. Appl. No. 16/282,160, filed Feb. 21, 2019, entitled: "Supporting Compilation and Extensibility on Unified Graph Based Intent Models".
Examination Report from counterpart European Application No. 19382267.3, dated Aug. 12, 2021, 5 pp.
Response to Examination Report dated Aug. 12, 2021, from counterpart European Application No. 19382267.3 filed Dec. 7, 2021, 14 pp.
Examination Report from counterpart European Application No. 19382267.3 dated Dec. 17, 2021, 5 pp.
Response to the Examination Report dated Dec. 17, 2021 from counterpart European Application No. 19382267.3, filed Apr. 12, 2022, 12 pp.

(56) References Cited

OTHER PUBLICATIONS

Communication pursuant to Article 94(3) EPC from counterpart European Application No. 19382267.3 dated Jun. 7, 2022, 5 pp.
Response to Communication pursuant to Article 94(3) EPC dated Jun. 7, 2022, from counterpart European Application No. 19382267.3 filed Oct. 3, 2022, 17 pp.

* cited by examiner

INTENT-BASED, NETWORK-AWARE NETWORK DEVICE SOFTWARE-UPGRADE SCHEDULING

This application is a continuation of U.S. application Ser. No. 16/414,447, filed May 16, 2019, which claims the benefit of EP Application No. 19382267.3, filed Apr. 10, 2019, the entire contents of which are hereby incorporated by reference.

TECHNICAL FIELD

This disclosure relates to computer networks, and more particularly, to management of network devices.

BACKGROUND

Network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for upgrading network device software according to an intent-based upgrade framework. A network management system (NMS) device, also referred to herein as a controller device, may configure network devices using low-level (that is, device-level) configuration data, e.g., expressed in Yet Another Next Generation (YANG) data modeling language. Moreover, the controller device may manage the network devices based on the configuration data for the network devices. According to the techniques of this disclosure, the controller device is configured to receive an upgrade request for upgrading the software of the network devices. In response to the upgrade request, the controller device may determine objectives and constraints, at least some of which may be specified in the upgrade request, and then generates a device upgrade schedule for upgrading the network devices that attempts to fulfill the objectives and constraints.

For example, the controller device may determine a set of relationships among the network devices and generate a unified graph model to represent the relationships. The controller device may obtain, based on the objectives and constraints, a set of devices from the unified graph model to model in a multi-objective upgrade graph. The controller device then computes an optimization algorithm on the multi-objective upgrade graph to produce a device upgrade schedule that attempts to fulfill the objects and constraints, at least some of which are specified in the upgrade request.

In some aspects, to specify path and device redundancy for facilitating fulfilling constraints regarding service and device availability, the techniques include an enhanced device model for specifying one or more redundant devices for a modeled device and an enhanced service model for specifying one or more redundant paths for a modeled service. When computing the optimization algorithm on the multi-objective upgrade graph, the controller device may use the redundancy information in the enhanced device models and enhanced service models to schedule upgrades for devices having redundant device or service relationships at different times.

The techniques of this disclosure may provide one or more technical advantages that provide at least one practical application. For example, the intent-based upgrade request may permit administrators to express an intent that a selected set of devices be upgraded without requiring the administrators to schedule the devices' upgrades, while also providing the ability of the administrators to express objectives and constraints for the upgrade process for the devices. Further, the techniques may provide an extensible, programmable infrastructure for defining new criteria for the upgrade process.

In one example, a method includes receiving, by a controller device that manages a plurality of network devices of a network that provide one or more services, an upgrade request; determining, by the controller device based on the upgrade request, an upgrade graph having nodes each representing one of the network devices or a network service provided by the network, the upgrade graph also having one or more edges each connecting two of the nodes and representing a network redundancy or service dependency; computing and assigning, for each edge of the edges, by the controller device, an edge weight to the edge by combining results of at least one objective function, each of the at least one objective function having a minimum objective or maximum objective for the network; partitioning, by the controller device, the upgrade graph into a plurality of sub-groups based on the edge weights; determining, by the controller device, an upgrade schedule based on the sub-groups; and upgrading, by the controller device, software of each of the plurality of network devices according to the upgrade schedule.

In another example, a controller device that manages a plurality of network devices comprises one or more processing units implemented in circuitry and configured to receive an upgrade request; determine, based on the upgrade request, an upgrade graph having nodes each representing one of the network devices or a network service provided by the network, the upgrade graph also having one or more edges each connecting two of the nodes and representing a network redundancy or service dependency; compute and assign, for each edge of the edges, an edge weight to the edge by combining results of at least one objective function, each of the at least one objective function having a minimum objective or maximum objective for the network; partition the upgrade graph into a plurality of sub-groups based on the edge weights; determine an upgrade schedule based on the sub-groups; and upgrade software of each of the plurality of network devices according to the upgrade schedule.

In another example, a computer-readable storage medium has stored thereon instructions that, when executed, cause a processor of a controller device that manages a plurality of network devices to receive an upgrade request; determine, based on the upgrade request, an upgrade graph having nodes each representing one of the network devices or a network service provided by the network, the upgrade graph also having one or more edges each connecting two of the nodes and representing a network redundancy or service dependency; compute and assign, for each edge of the edges, an edge weight to the edge by combining results of at least one objective function, each of the at least one objective function having a minimum objective or maximum objective for the network; partition the upgrade graph into a plurality of sub-groups based on the edge weights; determine an upgrade schedule based on the sub-groups; and upgrade software of each of the plurality of network devices according to the upgrade schedule.

The details of one or more examples are set forth in the accompanying drawings and the description below. Other features, objects, and advantages will be apparent from the description and drawings, and from the claims.

BRIEF DESCRIPTION OF DRAWINGS

Like reference characters refer to like elements throughout the figures and description.

DETAILED DESCRIPTION

Figure 1:
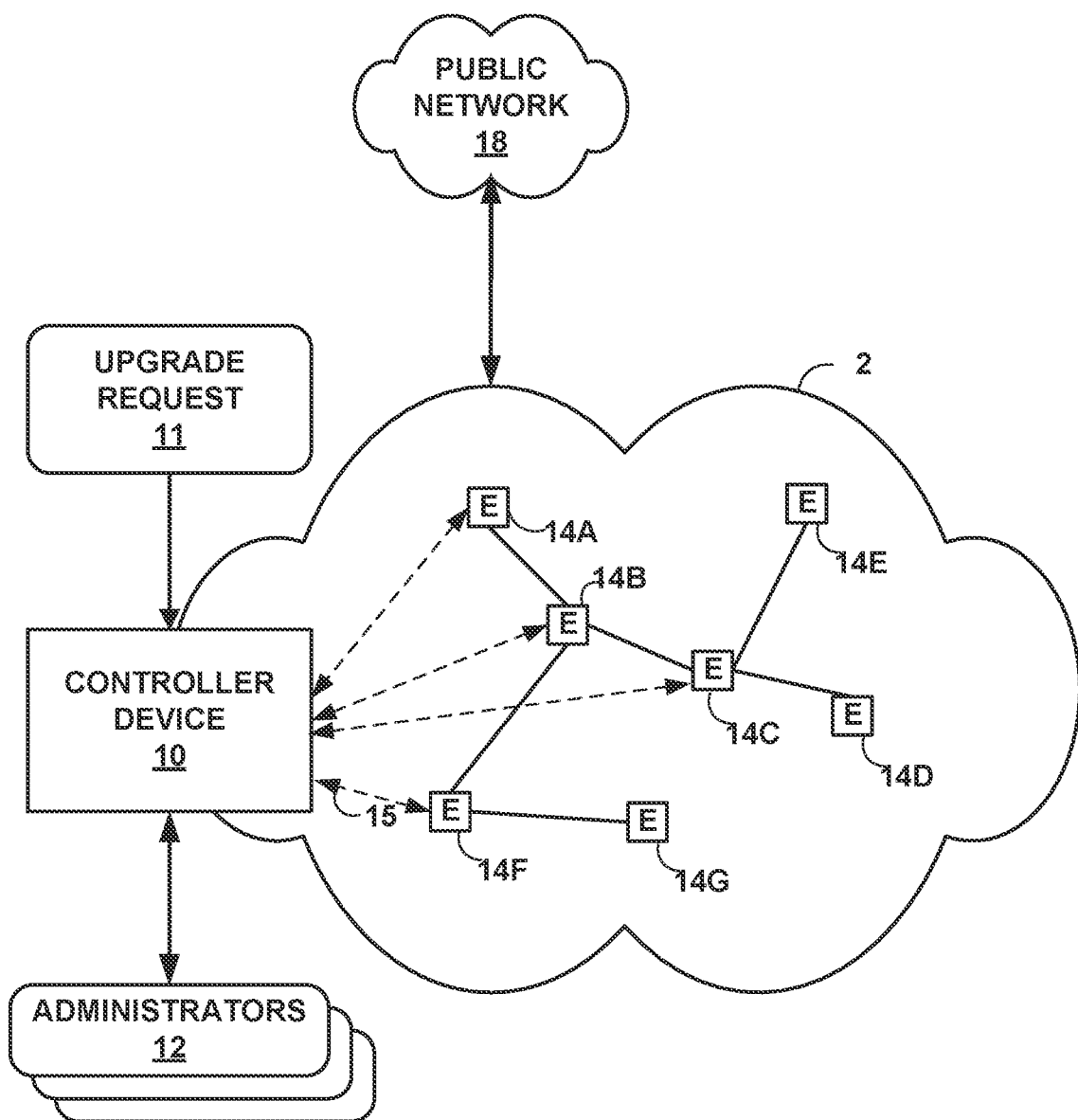
FIG. 1 is a block diagram illustrating an example including elements of an enterprise network that are upgraded using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrators 12 interacts with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 uses controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 determines whether the new set of configuration data includes any additional configuration parameters relative to the old intent data model, as well as whether the new set of configuration data modifies or omits any configuration parameters that were included in the old intent data model.

The intent data model may be a unified graph model, while the low-level configuration data may be expressed in YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. In some examples, the intent data model may be expressed in YAML Ain't Markup Language (YAML). Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data changes, e.g., device configuration additions and removals. That is, $y_1=f_1(x)$, $y_2=f_2(x)$, $y_N=f_N(x)$.

Controller device 10 may use YANG modeling for intent data model and low-level device configuration models. This data may contain relations across YANG entities, such as list items and containers. Conventionally, controller devices do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

In general, customer environments are configured to allow customers (e.g., administrators 12) to control intent realization and assure programmed intents. The techniques of this disclosure support customer requirements to support service layer agreements (SLA) in near real time. In this manner, customers' businesses will not be negatively impacted by intent realization. If resources for stateful intents become degraded (e.g., unreachable, highly utilized, or other issues on a corresponding device), controller device 10 may select appropriate resources to generate the desired configuration in near real time.

Controller device 10 may support SLA in near real time. For example, controller device 10 may support concurrent intent provisioning. Controller device 10 may use enhanced resource matching filters to include and exclude certain system resources. Controller device 10 may further maintain the network in a consistent state while managing business SLA. Controller device 10 may also support concurrent stateless intent provisioning. That is, controller device 10 may support concurrent intent updates without invalidating other intent changes. Controller device 10 may also support a current version of an intent graph until pending changes have been deployed.

U.S. application Ser. No. 16/125,245, entitled "DYNAMIC INTENT ASSURANCE AND PROGRAMMABILITY IN COMPUTER NETWORKS," filed Sep. 7, 2018, and incorporated herein by reference in its entirety, describes resource filter query semantics as below:

```
site(name: "Bangalore" ) {
  @Resource("PE") device(role: "PE", bgp-session-count<1000) ) {
    //"@Resource" signify it is a resource with name PE .
    id,
    @Resource("PE-Port") interface ( min:latency ) { //"@Resource"
      signify it is a resource with name PE-PORT
      name
    }
  }
}
```

From this, controller device 10 may derive decision variables, objective, and constraints. Controller device 10 may enhance the query to support extended resources and included resources, e.g., as shown below:

```
site(name: "Bangalore" ) {
  @Resource("PE") device(role: "PE", bgp-session-count<1000, excluded:
    {d1, d2}, included: {d3}) ) { //"@Resource" signify it is a resource
    with name PE.
    id,
    @Resource("PE-Port") interface ( min:latency ) { //"@Resource"
      signify it is a resource with name PE-PORT
      name
    }
  }
}
```

The excluded list may become a constraint to the resource selection optimization algorithm, while the included list may also become a constraint to the resource selection optimization algorithm. In the example above, the constraints include limits on resources defined as "not in {d1, d2}" and "in {d3}." U.S. patent application Ser. No. 16/370,189, filed Mar. 29, 2019, is incorporated by reference herein in its entirety.

In some examples in accordance with techniques of this disclosure, controller device 10 may receive, such as from an administrator or other user, upgrade request 11. Upgrade request 11 may include, for example, a command indicating an intent to upgrade the software of elements 14 from a software release "A" to a new or updated software release "B". Upgrade request 11 may further include a schedule upgrade query, describing one or more objectives or constraints to which the upgrade procedure must adhere. The software of an element 14 may include an image.

In response to upgrade request 11, controller device 10 may identify objectives and constraints, at least some of which may be specified in upgrade request 11, and then generate a device upgrade schedule for upgrading the elements 14 that attempts to fulfill the objectives and constraints. Controller device 10 may store objectives and/or constraints that apply to select elements 14.

For example, controller device 10 may determine a set of relationships among the elements 14 and generate a multi-objective upgrade graph to represent the relationships. Controller device 10 may compute an optimization algorithm on the multi-objective upgrade graph to produce a device upgrade schedule that attempts to fulfill the objects and constraints, at least some of which are specified in upgrade request 11.

Figure 2:
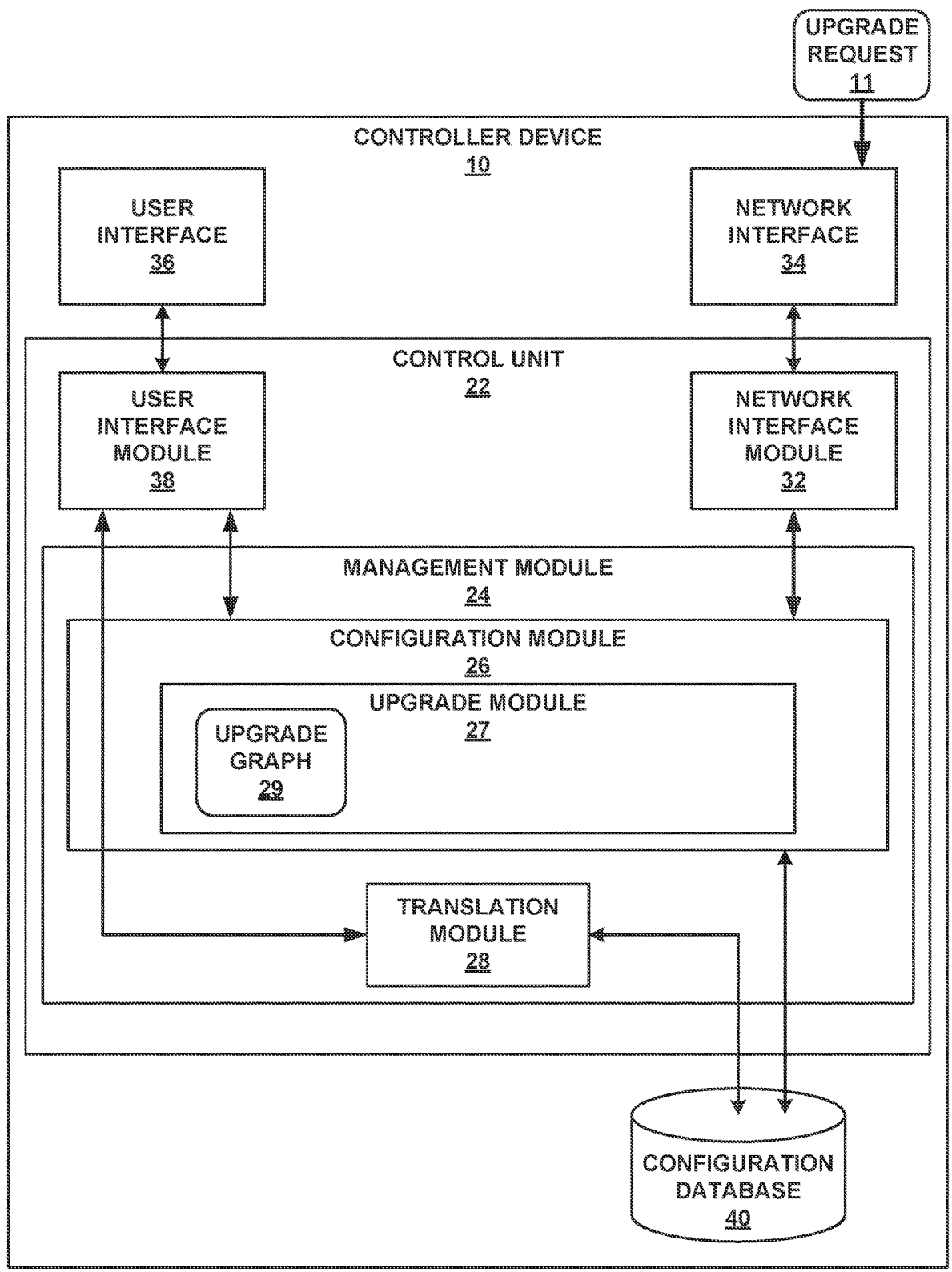
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Functionality of control unit 22 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 executes management module 24 to manage various network devices, e.g., elements 14 of FIG. 1. Management of a network device includes, for example, configuring the network devices according to instructions received from a user (e.g., administrators 12 of FIG. 1) and providing the user with the ability to submit instructions to configure the network devices. Management of a network device further includes upgrading the network device with updated software, such as an updated software image. In this example, management module 24 further includes configuration module 26 and translation module 28.

Management module 24 is configured to receive intent unified-graph-modeled configuration data for a set of managed network devices from a user, such as administrators 12. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 also includes configuration database 40. Configuration database 40 generally includes information describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., intent data model, or in some cases, both intent data model and low-level configuration information) for the managed devices (e.g., elements 14). In accordance with the techniques of this disclosure, configuration database 40 may include a unified intent data model.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github-.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may further update all changes in transaction semantics.

In accordance with techniques of this disclosure, controller device 10 may be configured to determine and execute an upgrade schedule to upgrade the software of multiple network devices 14 (FIG. 1) according to user-defined criteria. A user planning a software upgrade on multiple devices 14 may have one or more intended objectives, policies, constraints, or parameters regarding the order in which the devices are upgraded, or the date and/or time that the devices are upgraded. Some non-limiting examples of such user constraints may include (1) a maximum device "downtime", such as 5 minutes; (2) a maximum number of device connections that are simultaneously "down" at any given time, such as 5 percent of connections; (3) a latest-permissible date by which all devices 14 must upgraded to a new release or version; (4) a maximum number or amount of devices that may be upgraded simultaneously, such as 2 percent; a maximum "upgrade window" duration, such as two hours per day; (5) a priority dictating that devices with more subscribers should be upgraded first; or (6) redundant devices cannot be upgraded at simultaneously.

A user may specify one or more upgrade constraints within upgrade request 11. Controller device 10 receives upgrade request 11 from the user. Upgrade request 11 may include a schedule upgrade query that can be queried against a model. The schedule upgrade query may include various data inputs from the user, such as a device selector, scheduling parameters, and policies. One example of a schedule upgrade query is as follows:

```
{
  device-selector:site(name: "Bangalore" ) {
    device(role: "PE" ) {
      id,
    }
  },
  scheduling; {
    Start-date:2019-03-30,
    Time: 12.00PM,
    duration: 2hrs
    end-date:2019-04-30,
  },
```

-continued

```
policy: [ {name: min_sites_impact,
    priority:1,
    variables: {
      sites-impacted: 200
    }}
  ]
}
```

Upgrade request 11 may include a device selector. A device selector is a set of data indicating a particular device or set of devices 14 on which to apply the particular upgrade constraints specified in the schedule upgrade query. For example, in the sample upgrade query listed above, the device selector indicates devices that satisfy two criteria: (1) devices located at the site called "Bangalore", and (2) devices having the "role" of provider-edge (PE) devices. The device selector may follow a filter syntax, such as the syntax described in U.S. patent application Ser. No. 16/144,313, which is incorporated by reference herein in its entirety.

Upgrade request 11 may include one or more scheduling parameters, indicating a preferred date and/or time for controller device 10 to perform upgrades on devices 14. For example, the sample upgrade query listed above includes four scheduling parameters: (1) a start date of the update schedule; (2) a time of the day for deployment of upgrades; (3) an interval duration; and (4) an end date of the image update schedule.

Upgrade request 11 may include one or more policies. As described above, policies may include user preferences that dictate the order in which controller device 10 is to upgrade devices 14. Policies may be formatted to include a policy name, a policy priority level (such as an integer on a scale from one to ten), and one or more variables indicating the policy. In the sample upgrade query provided above, a policy named "min_sites_impact" has a priority of "1" and an integer variable having the value "200," which specifies a maximum number of sites that can be impacted in order to help realize the priority of minimizing the number of sites impacted.

In some examples, a policy may include an objective and a constraint. An "objective" expresses a business goal as a mathematical value. The objective may include an indication of an intent to maximize, minimize, or average a particular value. A "constraint" denotes a particular arithmetic relationship to a variable, such as an equality or inequality (e.g., >, <, >=, <=, =, or !=). An example of a policy explicitly defining an objective and a constraint is as follows:

```
name: min_sites_impact
version: 2015-04-30
description: policy definition for min traffic loss in network
variables:
  name: sites-impacted
  type: integer
metric : device('sites-managed')
objective: min
constraint: device('sites-managed') < $sites-impacted
```

In addition to user-specified upgrade criteria, controller device 10 may also receive information indicating device and/or service redundancy among devices 14. Device redundancy provides additional or alternate instances of particular network devices within a network infrastructure. Having redundant network devices may facilitate high availability in case of a network-device failure. In some examples, certain services that depend upon one or more network device 14, rather than the devices themselves, may provide service redundancy using different paths through a network. In order to reduce the risk of network failure, redundant devices and redundant connections should not be upgraded simultaneously. For example, if devices (p1, p2, p3, p4) are standalone devices defining a first path between p1 and p2, and a redundant path between p3 and p4, there will be network-traffic impact while upgrading these devices. To avoid customer traffic impact, p1, p2, p3, and p4 should not be upgraded at same time. Instead, p1 and p2 should be upgraded concurrently, and p3 and p4 should be upgraded concurrently but not concurrently with p1 and p2.

Controller device 10 may determine device redundancy information from the network device models, enhanced according to techniques of this disclosure, for the network devices in the network. An example network device model is as follows:

```
Module: device
  +--rw devices
    +--rw device* [device-id]
      +--rw device-id device-id
      +--rw alternate-device* [device-id]
        +--rw device-id -> ../device/device-id
```

In the above example, the enhanced network device model includes an alternate-device property for specifying a redundant, high-availability, or otherwise alternate network device that can assume traffic forwarding and service handling for the modeled network device. The asterisk indicates a list of elements. There may therefore be zero or more alternate devices.

A service model may include link information that will indicate both the device and the communication path, thereby indicating the alternate or redundant link information. A service-endpoint redundancy may be indicated through an "alternate node". In one example, an L3 VPN service contains a set of PE devices as endpoints. In multi-homing, a provider-edge device PE1 could be redundant for PE2. This will be represented as alternate-node, as in the example text model below:

```
module: Service
  +--rw services
    +--rw service* [service-id]
      +--rw service-id service-id
      +--rw service-type
      +--rw node* [node-id]
        +--rw node-id node-id
        +--rw alternate-node* [node-id]
          +--rw node-id -> ../node/node-id
      +--rw link* [link-id]
        +--rw link-id
        +--rw nodes ordered-by user
        | +--rw node? -> ../../../nw:node/node-id
        | +--rw node-tp
        +--rw alternate-link* [network-ref link-ref]
          +--rw link-ref leafref
```

In the above example, the enhanced service model includes an alternate-link property for specifying a redundant, high-availability, or otherwise alternate path for the service that can transport or otherwise handle traffic for the modeled service. The enhanced service model may further, as in the above example, specify an alternate-node for a node of the service. In another example, a label-switched path (LSP) may contain both a primary and a secondary path.

Both the primary path and the secondary path may be modeled as a link. The primary path link may include the secondary path as an "alternative" link. Additionally, the secondary path link may include the primary path as an alternative link. The asterisk indicates a list of elements. There may therefore be zero or more alternate links.

In some examples, controller device 10 may also consider all of the services provided by a device to a customer, so as to determine additional forms of redundancy. As in the example provided below, redundancy may be an inherent property of the YAML dictionary:

---
name: redundancy_policy
version: 2015-04-30
description: policy definition for considering redundancy
variables :
  name: customer
  type: string
metric : device(customer_name: $customer).redundancy
Objective:max
---

Controller device 10 may include upgrade module 27. Upgrade module 27 may be configured to receive data inputs such as device selectors, scheduling parameters, user policies, and redundancy information, and compute a device upgrade schedule that satisfies either all of, or the highest-possible number of, these constraints. For example, upgrade module 27 may compute a multi-objective graph, such as upgrade graph 29, and then compute an optimization algorithm on the graph.

Upgrade graph 29 includes a plurality of nodes (or vertices) and edges, each edge connecting two nodes. Each node within upgrade graph 29 represents a single network device. Each node within upgrade graph 29 may include device-level information, or upgrade constraints pertaining to the respective network device, such as a device upgrade time, a number of customers or users associated with the device, or a device location. At least some of the edges each connecting two nodes indicate either a device redundancy or a service-based dependency, such as an upgrade policy relating two network devices to each other.

Once upgrade module 27 has computed the nodes and edges of upgrade graph 29, upgrade module may determine and assign a "weight" to each of the nodes and edges. Upgrade module may determine and assign node weights based on, for example, the required upgrade time for the respective network device, or the criticality of the device (e.g., the number of subscribers to the respective device). Based on such properties, upgrade module 27 will facilitate uniform distribution of more devices a across the subgraphs, as described in further detail below.

For edges indicating a service-based dependency, such as an upgrade objective or policy as specified in upgrade request 11, the edge weight may indicate the user-specified "priority" for that policy (such as an integer on a scale from 1 to 10), as also specified in upgrade request 11. In this example, a lower priority value has a higher priority, while a high priority value has a lower priority. In other examples, a priority level may be indicated in other ways.

For an edge between two nodes indicating multiple objectives, upgrade module 27 may assign a single scalar edge weight based on multi-objective optimization function. Multi-objective optimization provides a set of solutions that balances competing upgrade objectives. Multi-objective functions can have both maximization and minimization objective functions. Mathematically, this may be expressed as:

$$\min/\max f_m(x), \text{ for } m=1,2\ldots N, \text{ where, for example:}$$

$f_1(x)$—minimize traffic loss
$f_2(x)$—minimize number of sites impacted
$f_3(x)$—maximize VPN service uptime for Customer 1

A combination-based formulation combines the multiple objectives into a single objective. Upgrade module 27 may first normalize the range of objective function outputs such that the output will be scaled to between 0 and 1. Mathematically, this may be expressed as:

$$f'_x = (f_x - f_{min})/f_{range}, \text{ where}$$

$f'_x$—normalized value of x in range [0,1]
$f_x$—older value of x
$f_{min}$—min value in older range
$f_{range}$—older range Next, upgrade module 27 may convert all minimization functions to maximization functions, or vice versa. As all the function ranges are normalized to [0,1], upgrade module 27 may convert the minimization functions to maximization functions as follows:

$$\max f(x) = 1 - (\min f(x))$$

Based on the normalized objective functions, upgrade module 27 may compute an initial objective weight $o_i$ for each objective and arrange the objective weights for each edge e into an objective vector $o^e = (o^e_1, o^e_2, \ldots o^e_n)$.

Each objective may have a priority as specified in upgrade request 11. Upgrade module 27 may arrange the respective priorities from multiple objectives into a priority vector. Based on this priority vector, upgrade module 27 may normalize the edge weights as follows:

$$w^e = \sum_{i=1}^{m} o^e_i P^e_i$$

where:
$w^e$ is the scalar edge weight for edge e,
$o^e_i$ is the objective weight of the 'i'th objective of edge e,
$P^e_i$ is the priority of the 'i'th objective of edge e, and
m is the number of objectives relating the two nodes connected by edge e.

For example, an edge with three objectives having the objective weights 2, 2, and 1, and priorities 1, 5, and 1, respectively, will have an objective weight vector of (2, 2, 1) and a priority vector of (1, 5, 1). Upgrade module will assign the edge a scalar edge weight of (2×1)+(2×5)+(1×1)=2+10+1=13.

Once upgrade module 27 has assigned a node weight to each node and an edge weight to each edge, upgrade module 27 may compute a graph-partitioning algorithm to "partition" upgrade graph 29 into a plurality of subgroups. Each subgroup may indicate, for example, a set of network devices that, based on redundancy relationships and/or user policies, can or should, to the extent feasible, be upgraded concurrently. Upgrade module 27 may compute a graph-partitioning algorithm selected to attain at least one of two parameters: (1) the sum of all node weights in each subgroup is approximately equal among subgroups; or (2) the sum of all edge weights that connect two distinct subgroups is minimized. In mathematical terms:

$$\text{Given a graph } G = (N, E, W_N, W_E),$$

where:
N=nodes (or vertices)

E=edges
W_N=node weights
W_E=edge weights

For partitioning of graph G, choose partitions N=N$_1$∩N$_2$∩ . . . ∩N$_K$ such that:
(1) The sum of the node weights in each N$_j$ is distributed evenly (load balanced).
(2) The sum of all edge weights of edges connecting all different partitions is minimized (min edge-cut).

G may be any upgrade graph described in this disclosure. In the context of multi-objective graph partitioning this is done as follows:

In some examples, upgrade module 27 applies K-way partitioning method is chosen to partition a graph into k sets. Upgrade module 27 obtains a value k that is the number of slots calculated from the user schedule, which may be indicated in the upgrade request 11.

Once upgrade module 27 has partitioned upgrade graph 29 into a plurality of subgroups, upgrade module 27 may "refine" each subgroup. Upgrade module 27 may refine each subgroup so as to arrange or re-order all of the devices within the subgroup based on device-level criteria, such as device-critical timings, upgrade priority based on number of subscribers per device, device geolocation, device-upgrade time, or the maximum number of parallel nodes to be upgraded allowed in one maintenance window. Upgrade module 27 may also refine the order of devices within a subgroup according to criteria, such as a maximum number of parallel upgrades allowed or a maximum number of upgrades per maintenance window, user policies or time, cost, and/or processing constraints. As other examples, devices within subgroups may be reordered based on device critical timings, prioritizing devices with larger numbers of subscribers, geolocations, and upgrade times. Upgrade module 27 may avoid upgrading devices in different subgroups concurrently. For instance, if the user policy "Max number of parallel upgrades allowed" is defined, the set of devices are picked up from each subgroup will be less than or equal to the value of "Max number of parallel upgrades allowed". The total number of devices chosen for each slot will be less than or equal to the maximum number of upgrades in maintenance window.

Once upgrade module 27 has refined each subgroup, upgrade module may compute an upgrade schedule based on the subgroups. For example, upgrade module 27 may select multiple devices from each subgroup to upgrade in parallel, and assign the devices to an upgrade time slot. Finally, upgrade module 27 may execute the device software upgrades according to the schedules. In particular, upgrade module 27 may communicate with element configuration service 116 to communicate with each device to be upgraded, and to execute the device upgrades based on the determined upgrade schedule. As one example, upgrade module 27 may invoke the element configuration service 116 to direct a managed device to a repository with a software update, along with a directive to upgrade the device with the software update.

Figure 3:
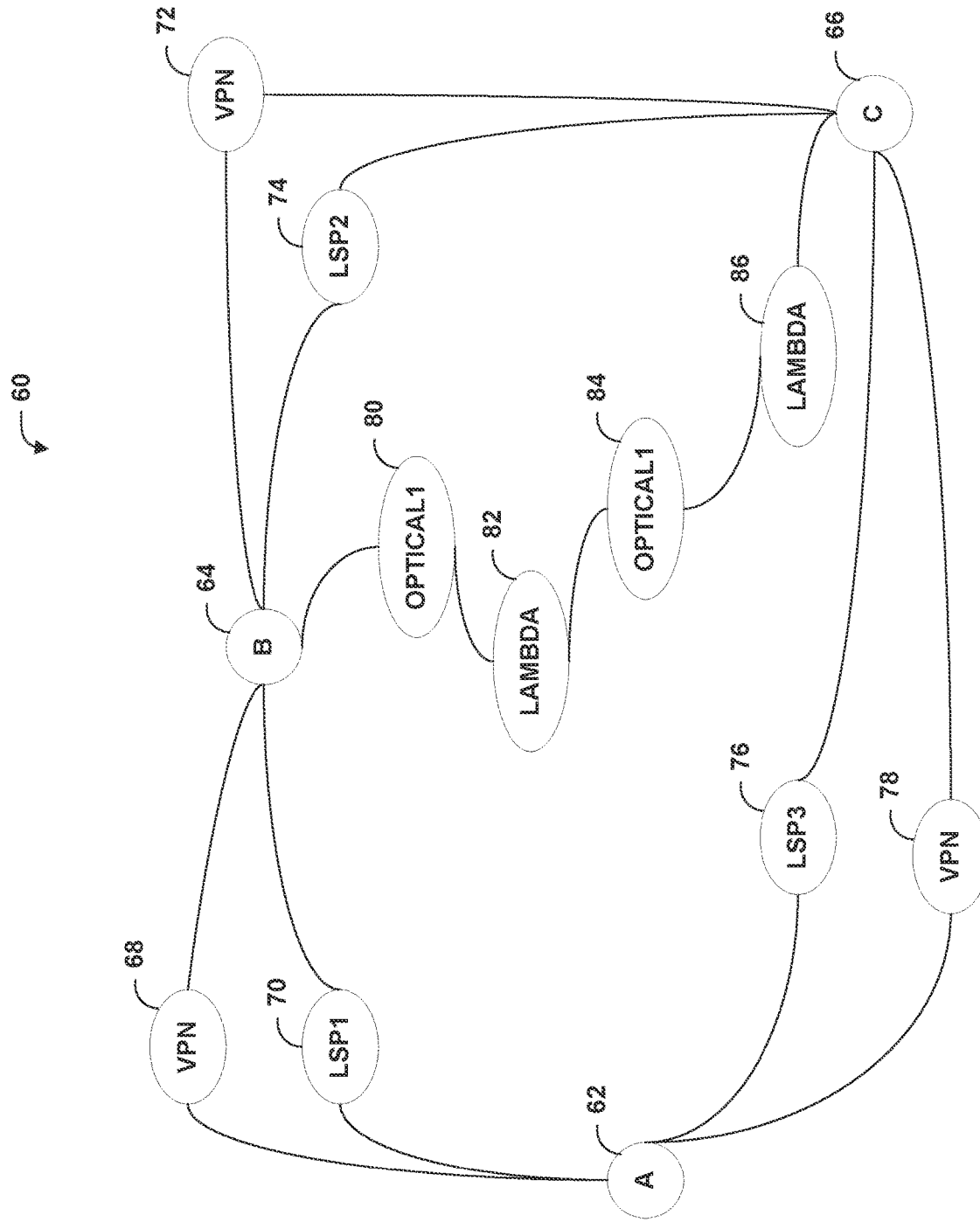
FIG. 3 is a conceptual diagram illustrating an example unified graph model for an intent data model.

FIG. 3 is a conceptual diagram illustrating an example unified graph model 60 for an intent data model. Unified graph model 60, in this example, includes nodes A 62, B 64, and C 66, among others. Initially, unified graph model may not include VPN 68, VPN 72, and VPN 78, nor optical1 80, lambda 82, optical1 84, and lambda 86. As a result of modifications through intent data model updates, node A 62 is coupled to node B 64 via VPN 68 and LSP1 70, node B 64 is coupled to node C 66 via VPN 72 and LSP2 74, and node C 66 is coupled to node A 62 via VPN 78 and LPS3 76.

Furthermore, as a result of additional capacity being required as an optical intent, additional nodes optical1 80, lambda 82, optical1 84, and lambda 86 are added between node B 64 and node C 66.

Stateful business policies can be written on top of a stateless intent layer. For example, a user may state the intent "provide high bandwidth VPN connectivity between sites A, B, and C with bandwidth between A-B, B-C, C-A, . . . ." This may lead to various stateless intents. The stateful intent may be compiled into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP-LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. Applicant Ser. No. 15/462,465, filed Mar. 17, 2017, which is incorporated by reference in its entirety. Thus, intent data models can be represented using unified graph models. When more use cases are added, the intent data model (i.e., the unified graph model) can be extended. Also, use of unified graph models allows for retrieval of intents based on endpoints (e.g., by querying the graph).

Figure 4:
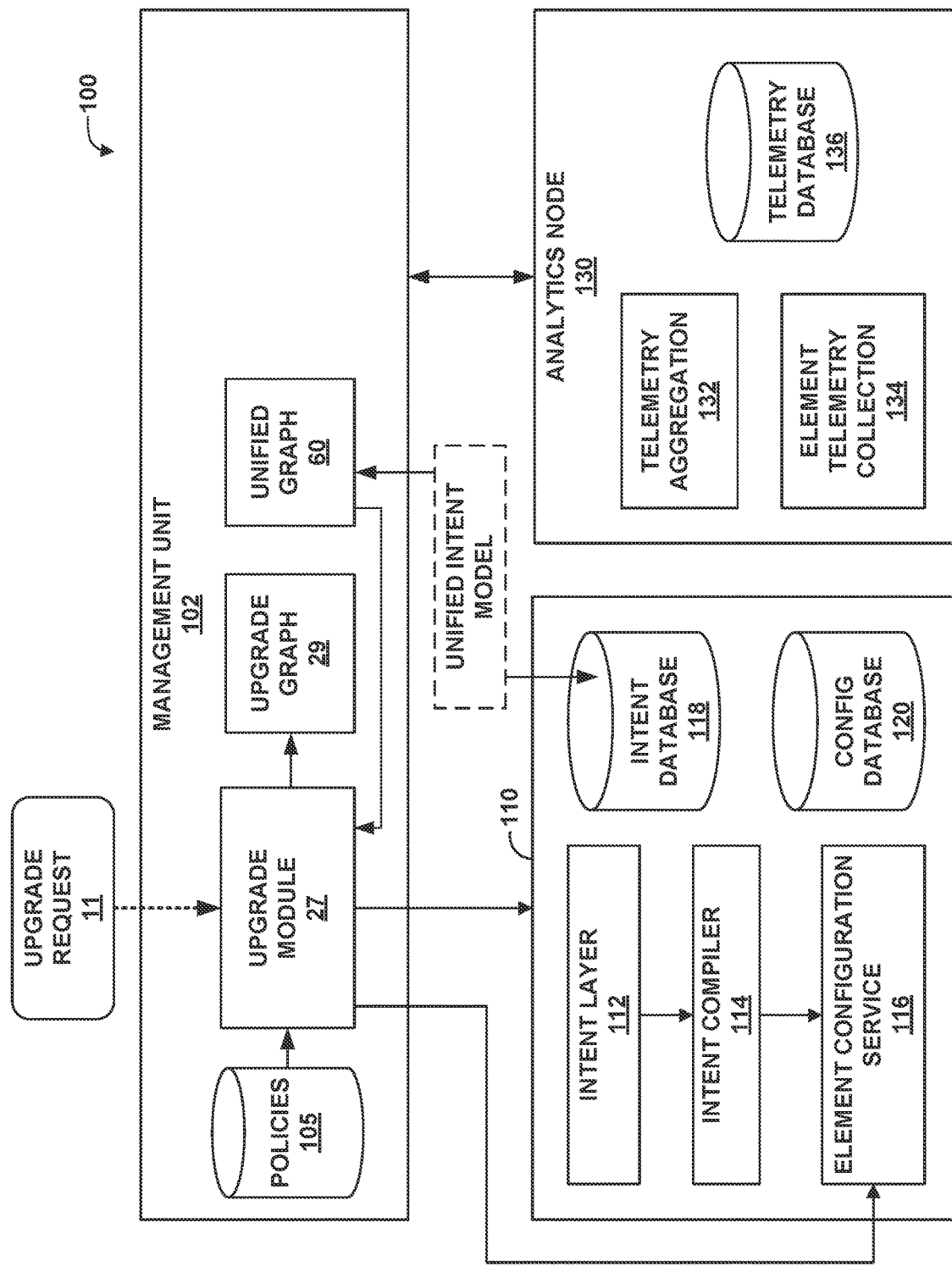
FIG. 4 is a conceptual diagram illustrating an example model of components of a controller device, such as the controller device of FIGS. 1 and 2, according to techniques of this disclosure.

FIG. 4 is a conceptual diagram illustrating an example model 100 of components of a controller device, such as controller device 10, according to techniques of this disclosure. In this example, model 100 includes management unit 102, intent infrastructure 110, and analytics node 130. Management unit 102 includes upgrade module 27, and policies 105. Intent infrastructure 110 includes intent layer 112, intent compiler 114, element configuration service 116, intent database 118, and configuration (config.) database 120. Analytics node 130 includes telemetry aggregation unit 132, element telemetry collection 134, and telemetry database 136. Management module 24 of FIG. 2 may include components that perform the functionality attributed to various components of model 100. For example, configuration module 26 of FIG. 2 may correspond to intent infrastructure 110, translation module 28 may correspond to intent compiler 114, configuration database 120 may correspond to configuration database 40 and so on. Certain components shown in FIG. 4 may be implemented by management module 24 of FIG. 2.

Upgrade module 27 may communicate with element configuration service 116 to communicate with each device to be upgraded, and to execute the device upgrades based on the determined upgrade schedule. As one example, upgrade module 27 may invoke the element configuration service 116 to direct a managed device to a repository with a software update, along with a directive to upgrade the device with the software update. In some cases, element configuration service 116 is an element management service (EMS) that is part of an EMS layer.

Management unit 102 calls intent layer 112 to provision stateless intents. The techniques of this disclosure may be used to ensure business policies in the form of intents are translated to the network in near real time to prevent negative impacts to SLA. Intent compiler 114 may be configured to compile intents concurrently. Additional details regarding parallel, concurrent compilation of intents are described in "SUPPORTING COMPILATION AND EXTENSIBILITY ON UNIFIED GRAPH BASED INTENT MODELS," U.S. application Ser. No. 16/282,160, filed Feb. 21, 2019, the entire contents of which are hereby incorporated by reference.

When a business policy (that is, stateful intent) is degraded, management unit 102 may determine the appropriate resources to address the degraded intent and call intent infrastructure 110 to provision the intents. When intent realization is failed, management unit 102 may determine a resolution for the failure. For instance, if the failure is related to new resources, management unit 102 may update a set of excluded resources, get new resources, and provision the network. If the failure is not related to new resources but because of existing network elements, and the existing network elements are not reachable, management unit 102 may determine to keep the old resources and provision the network. If the failure is due to semantic failures, management unit 102 may submit a negated intent, provision the network, and raise an alarm representing the semantic failure.

Thus, in general, management unit 102 ensures that there are no conflicting changes in an intent data model change. After ensuring that there are no conflicting changes, management unit 102 submits the intent data model changes to intent infrastructure 110. When stateless intent changes are submitted, intent infrastructure 110 may create a change set that holds the set of vertices updated (e.g., created, updated, or deleted) and corresponding version identifiers. Intent infrastructure 110 also maintains both a deployed intent data model and an undeployed intent data model in intent database 118. Intent infrastructure 110 triggers intent compiler 114 to execute translators of impacted vertices in the change set.

Translations may be asynchronous, and therefore, intent infrastructure 110 may ensure that intent changes do not override other intent changes, through the use of a global intent version. The global intent version signifies the version of the intent graph that generated the low-level model resources. Intent infrastructure 110 maintains the global intent version of the deployed graph model, along with the low-level model resources, e.g., in configuration database 120. If a newly generated low-level model global intent version is less than the global version on the low-level model, intent infrastructure 110 may rerun intent compiler 114.

To support updates, intent infrastructure 110 supports versioning of intent data models, such as deployed and undeployed intent data models. Maintaining one version of a complete graph per change would serialize the intent changes. Thus, intent infrastructure 110 maintains the deployed and undeployed intent data models, including deployed vertices and undeployed vertices respectively, within the same graph. Each vertex contains a state and a version-id. Intent infrastructure 110 may set the state values for vertices corresponding to intent changes to represent states of "created," "updated," or "deleted." Intent infrastructure 110 may also set state a state value to represent "deployed" once the vertex has been deployed, as discussed below.

Intent infrastructure 110 may maintain updated vertices within the same graph. As noted above, intent infrastructure 110 may maintain a snapshot table containing a list of universally unique identifiers (UUIDs) and old versions of corresponding updated vertices.

When a vertex is created, intent infrastructure 110 sets the state value of the created vertex to a value representing a "created" state. After the vertex is deployed to the network, intent infrastructure 110 updates the state value to represent a "deployed" state.

When a vertex is updated, intent infrastructure 110 sets the state value of the updated vertex to a value representing an "updated" state. After the vertex is deployed to the network, intent infrastructure 110 updates the state value to represent a "deployed" state.

When a vertex is deleted, intent infrastructure 110 sets the state value of the created vertex to a value representing a "deleted" state. After deploying updates to the network, intent infrastructure 110 removes the deleted vertex from the graph.

The following table represents example state transitions:

| State | If version == version in change set | If version != version in change set |
|---|---|---|
| Create | Deployed | Update |
| Update | Deployed | Update |
| Delete | Remove from graph | NA |

In this way, intent database 118 includes a representation of business policies for a network. This representation may take the form of a unified graph 60, such as unified graph 60 of FIG. 3.

A customer may interact with management unit 102 to define new criteria for the upgrade process performed by upgrade module 27, such as new service or device properties, or constraints that can be predicated on properties of the unified graph 60 and queried against for an upgrade request 11. As such a customer may add a new role or tag for a network device or add new policies 105 by following the syntax with objectives.

Figure 5:
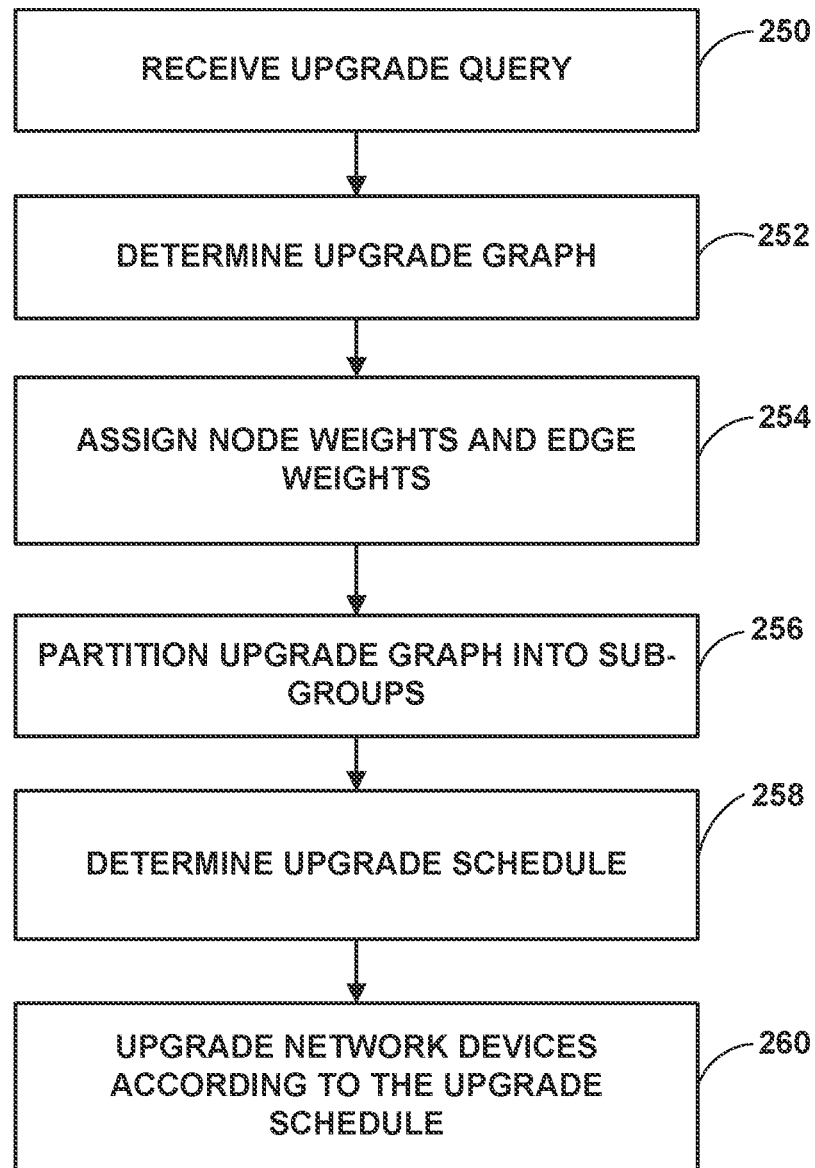
FIG. 5 is a flowchart illustrating an example method that may be performed by a controller device for upgrading network device software.

FIG. 5 is a flowchart illustrating an example method that a controller device may use to upgrade network device software for multiple devices. The method is described with respect to example controller device 10. Controller device 10 receives an upgrade request 11 having a schedule upgrade query (250), such as from a network administrator or other user. The schedule upgrade query may specify one or more user criteria or preferences regarding the time or the order in which the controller device is to perform the software upgrades.

Based on the schedule upgrade query, and in some cases based on device-redundancy and/or service-redundancy data provided according to the corresponding enhanced models, the controller device may query the unified graph 60, using a graph query language such as GraphQL, and use the result to obtain an upgrade graph describing the network (252). For example, the graph may include nodes representing the various devices within the network that satisfy the schedule upgrade query, and edges between the nodes indicating redundancy relationships and upgrade-policy relationships between the devices. Next, controller device 10 computes and assigns an edge weight to each of the edges based on one or more upgrade objectives, which may be derived from policies (254).

Controller device 10 partitions the graph into a plurality of subgroups (256). Controller device 10 may determine the subgroups by at least one of two criteria: the sum of all node weights within a subgroup is approximately equal between subgroups, or the sum of all edge weights for edges connecting two different subgroups is minimized. Each subgroup may indicate a set of network devices that should not be upgraded together.

Based on the subgroups, controller device 10 determines an upgrade schedule (258). For example, controller device 10 may select a group of devices from one subgroup to upgrade in parallel, i.e., concurrently, and assigns this group to an upgrade slot. Finally, controller device 10 may upgrade the network devices according to the upgrade schedule (260).

Figure 6:
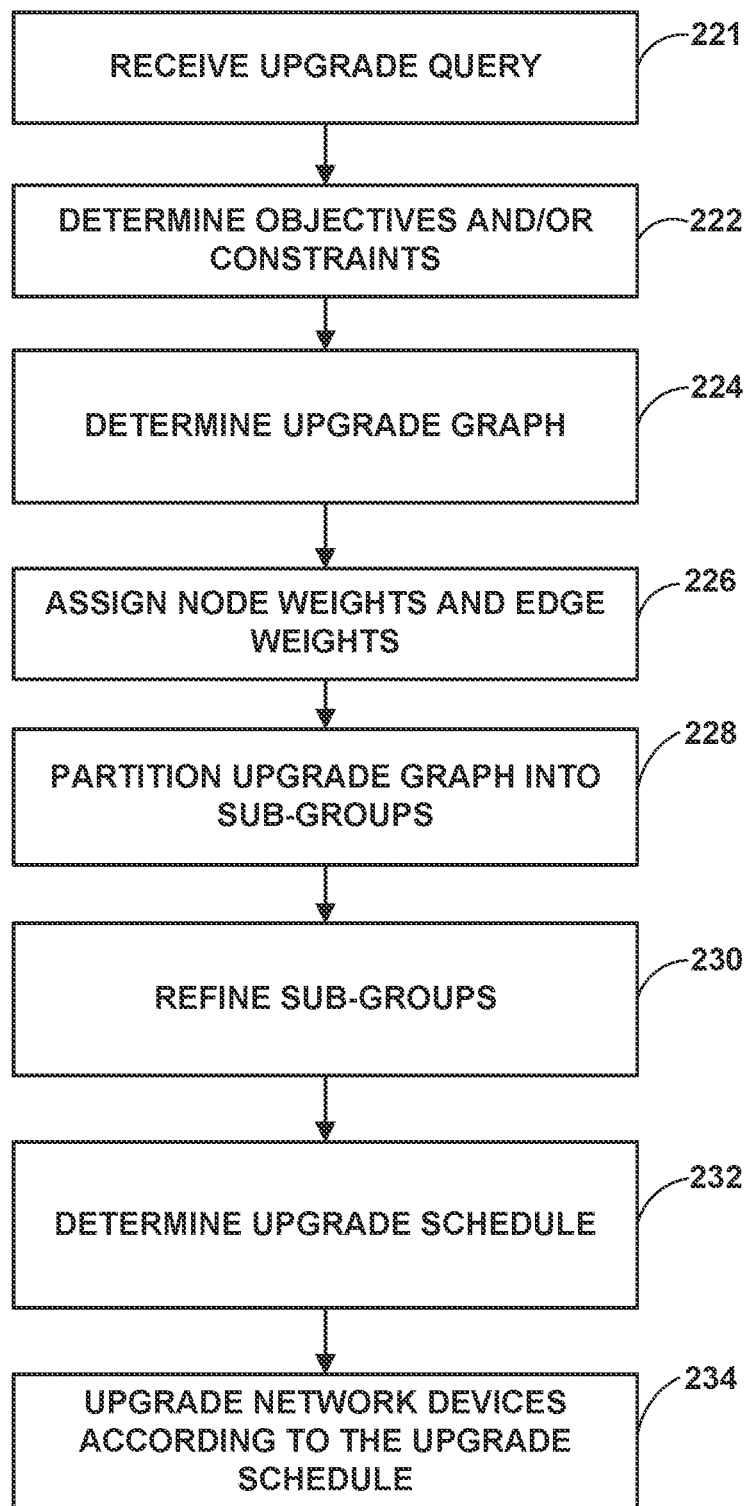
FIG. 6 is a flowchart illustrating an example method for upgrading network device software in accordance with the techniques of this disclosure.

FIG. 6 is a flowchart illustrating an example method for upgrading network device software in accordance with the techniques of this disclosure. The method is described with respect to example controller device 10. Controller device 10 receives an upgrade request 11 having a schedule upgrade query (221), such as from a network administrator or other user. The schedule upgrade query may specify one or more user criteria or preferences regarding the time or the order in which the controller device is to perform the software upgrades. Based on the schedule upgrade query, controller device 10 may determine one or more upgrade scheduling objectives or constraints (222) that the controller device is to honor when computing an upgrade schedule.

Controller device 10 incorporates the determined objectives and constraints from the schedule upgrade query, and in some cases based on device-redundancy and/or service-redundancy data provided according to the corresponding enhanced models, the controller device may query the unified graph 60, using a graph query language such as GraphQL, and use the result to obtain an upgrade graph describing the network (224). For example, the upgrade graph may include nodes representing the various devices within the network, and edges between the nodes indicating redundancy relationships and upgrade-policy relationships between the devices. Next, controller device 10 computes and assigns an edge weight to each edge based on multiple objectives, which may be derived from upgrade policies (226).

Controller device 10 partitions the graph into a plurality of subgroups (228). Controller device 10 may determine the subgroups by at least one of two criteria: the sum of all node weights within a subgroup is approximately equal between subgroups, or the sum of all edge weights for edges connecting two different subgroups is minimized. Each subgroup may indicate a set of network devices that should not be upgraded together.

Once controller device 10 has determined the plurality of subgroups, the controller device may refine the individual subgroups by arranging individual network devices based on device-level criteria, a maximum number of parallel upgrades allowed, and/or a maximum number of upgrades per maintenance window (230).

Based on the refined subgroups, controller device 10 determines an upgrade schedule (232). For example, controller device 10 may select a group of network devices from a single subgroup to upgrade in parallel, and assigns these new groups to an upgrade slot. Finally, the controller device may upgrade the network devices according to the upgrade schedule (234).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:

receiving, by a controller device that manages network devices of a network that provides services, an upgrade request and at least one policy specifying an objective that is a minimum objective or a maximum objective for the network;

obtaining, by the controller device, a redundancy model indicative of redundancy information for the network, wherein the redundancy model comprises one of: (1) a network device model that includes device redundancy information indicating a device redundancy for a first network device and a second network device of the network devices, or (2) a service model that includes service redundancy information indicating a service redundancy for a service of the services, wherein obtaining the redundancy model comprises obtaining a unified intent model that comprises the network device model and the service model and wherein the unified intent model comprises a graph database configured to graphically represent at least one of the device redundancy information or the service redundancy information, the graph database including a plurality of nodes representing one or more network resources and edges between the nodes representing the at least one of the device redundancy information or the service redundancy information;

determining, by the controller device based on the upgrade request and the redundancy model, an update graph having update graph nodes each representing one of the network devices or one of the services, the update graph also having at least one edge that connects two of the update graph nodes and that indicates the network device redundancy or the service redundancy;

determining, by the controller device based on the update graph including the at least one edge and based on the at least one policy, an update schedule for performing an update of software for the network devices that ensures availability for the first network device or second network device or availability for the service; and updating, by the controller device, the software of each of the network devices according to the update schedule.

2. The method of claim 1, wherein the redundancy model comprises a modified YANG or YAML data model that comprises the network device redundancy information or the service redundancy information.

3. The method of claim 1, wherein the network device model comprises syntax to indicate an alternate network device of the network devices for a network device of the network devices.

4. The method of claim 3, wherein the syntax comprises a device-id property to indicate a device identifier for the network device and the syntax comprises an alternate-device property to indicate an alternate device identifier for the alternate network device.

5. The method of claim 1, wherein the service model comprises:
first syntax for a link and an alternate link; or
second syntax for a node and an alternate node.

6. The method of claim 5, wherein the first syntax comprises a link-id property to indicate a link identifier and the first syntax comprises an alternate-link property to indicate an alternate link identifier.

7. The method of claim 5, wherein the second syntax comprises a node-id property to indicate a node identifier and the second syntax comprises alternate-node property to indicate an alternate node identifier.

8. The method of claim 1, wherein the upgrade request comprises a device selector that selects the network devices based on a tag or role of the network devices.

9. The method of claim 1, wherein the at least one policy specifies at least one of:
a maximum down-time for any network device;
a maximum number of connections that may be down at any one time;
a latest-permissible upgrade completion date;
a maximum percent of devices that to be upgraded at any one time;
a maximum upgrade-window duration; or
an upgrade priority based on devices having the most subscribers.

10. The method of claim 1, further comprising:
receiving, by the controller device, a criteria definition that defines new criteria for performing the update of the software,
wherein the upgrade request specifies the new criteria.

11. The method of claim 1, wherein obtaining the redundancy model comprises receiving the service redundancy information from the service of the services.

12. The method of claim 1, wherein obtaining the redundancy model comprises determining, by the controller device based on the services, the redundancy information for the network.

13. A controller device that manages a plurality of network devices of a network, the controller device comprising one or more processing units implemented in circuitry and configured to:
receive an upgrade request and at least one policy specifying an objective that is a minimum objective or a maximum objective for the network;
obtain a redundancy model indicative of redundancy information for the network, wherein the redundancy model comprises one of: (1) a network device model that includes device redundancy information indicating a device redundancy for a first network device and a second network device of the network devices, or (2) a service model that includes service redundancy information indicating a service redundancy for a service of the services, wherein to obtain the redundancy model, the one or more processing units are configured to obtain a unified intent model that comprises the network device model and the service model and wherein the unified intent model comprises a graph database configured to graphically represent at least one of the device redundancy information or the service redundancy information, the graph database including a plurality of nodes representing one or more network resources and edges between the nodes representing the at least one of the device redundancy information or the service redundancy information;
determine, based on the upgrade request and the model, an update graph having update graph nodes each representing one of the network devices or one of the services, the update graph also having at least one edge that connects two of the update graph nodes and that indicates the network device redundancy or the service redundancy;
determine, based on the update graph including the at least one edge and the at least one policy, an update schedule for performing an update of software for the network devices that ensures availability for the first network device or second network device or availability for the service; and
update the software of each of the network devices according to the update schedule.

14. The controller device of claim 13, wherein the redundancy model comprises a modified YANG or YAML data model that comprises the network device redundancy information or the service redundancy information.

15. The controller device of claim 13, wherein to obtain the redundancy model the controller device is configured to receive the service redundancy information from the service of the services.

16. The controller device of claim 13, wherein to obtain the redundancy model the controller device is configured to determine, based on the services, the redundancy information for the network.

17. The controller device of claim 13, wherein the network device model comprises syntax to indicate an alternate network device of the network devices for a network device of the network devices, and wherein the syntax comprises a device-id property to indicate a device identifier for the network device and the syntax comprises an alternate-device property to indicate an alternate device identifier for the alternate network device.

18. The controller device of claim 13, wherein the service model comprises:
  first syntax for a link and an alternate link; or
  second syntax for a node and an alternate node.

19. The controller device of claim 13, wherein the one or more processing units are further configured to receive a criteria definition that defines new criteria for performing the update of the software, wherein the upgrade request specifies the new criteria.

20. A computer-readable storage medium having stored thereon instructions that, when executed, cause a processor of a controller device that manages a plurality of network devices of a network to:
  receive an upgrade request and at least one policy specifying an objective that is a minimum objective or a maximum objective for the network;
  obtain a redundancy model indicative of redundancy information for the network, wherein the redundancy model comprises one of: (1) a network device model that includes device redundancy information indicating a device redundancy for a first network device and a second network device of the network devices, or (2) a service model that includes service redundancy information indicating a service redundancy for a service of the services, wherein the instructions that cause the processor to obtain the redundancy model comprise instructions that cause the processor to obtain a unified intent model that comprises the network device model and the service model and wherein the unified intent model comprises a graph database configured to graphically represent at least one of the device redundancy information or the service redundancy information, the graph database including a plurality of nodes representing one or more network resources and edges between the nodes representing the at least one of the device redundancy information or the service redundancy information;
  determine, based on the upgrade request and the model, an update graph having update graph nodes each representing one of the network devices or one of the services, the update graph also having at least one edge that connects two of the update graph nodes and that indicates the network device redundancy or the service redundancy;
  determine, based on the update graph including the at least one edge and the at least one policy, an update schedule for performing an update of software for the network devices that ensures availability for the first network device or second network device or availability for the service; and
  update the software of each of the network devices according to the update schedule.

* * * * *